United States Patent
Kuzmin et al.

(10) Patent No.: US 8,878,538 B2
(45) Date of Patent: Nov. 4, 2014

(54) RECEIVER COIL ASSEMBLY FOR AIRBORNE GEOPHYSICAL SURVEYING WITH NOISE MITIGATION

(75) Inventors: Petr Valentinovich Kuzmin, Aurora (CA); Jack Dodds, Aurora (CA)

(73) Assignee: Geotech Airborne Limited, St. Michael (BB)

( * ) Notice: Subject to any disclaimer, the term of this patent is extended or adjusted under 35 U.S.C. 154(b) by 860 days.

(21) Appl. No.: 12/954,797

(22) Filed: Nov. 26, 2010

(65) Prior Publication Data

US 2011/0181290 A1     Jul. 28, 2011

Related U.S. Application Data

(60) Provisional application No. 61/264,762, filed on Nov. 27, 2009.

(51) Int. Cl.
*G01V 3/16*     (2006.01)
*G01V 3/17*     (2006.01)

(52) U.S. Cl.
CPC ........................................ *G01V 3/17* (2013.01)
USPC .......................................................... 324/331

(58) Field of Classification Search
CPC ........... G01V 3/165; G01V 3/17; G01V 3/15; G01C 15/00; G01R 33/02; G01N 27/725; G01N 27/72; G01N 27/80; G01N 27/041; G01N 27/043; G01N 27/048; G01N 27/06; G01N 27/08; G01N 27/12
See application file for complete search history.

(56) References Cited

U.S. PATENT DOCUMENTS

| | | | | |
|---|---|---|---|---|
| 2,955,250 A | * | 10/1960 | La Motte Shaw et al. | 324/330 |
| 3,014,176 A | * | 12/1961 | McLaughlin et al. | 324/330 |
| 3,617,866 A | * | 11/1971 | Dowsett et al. | 324/330 |
| 4,628,266 A | * | 12/1986 | Dzwinel | 324/330 |
| 6,765,383 B1 | | 7/2004 | Barringer | |
| 6,876,202 B2 | | 4/2005 | Morrison et al. | |
| 7,157,914 B2 | | 1/2007 | Morrison et al. | |
| 2005/0285598 A1 | | 12/2005 | Barringer | |
| 2006/0004519 A1 | | 1/2006 | Humphrey et al. | |
| 2008/0125920 A1 | | 5/2008 | Miles et al. | |
| 2009/0252372 A1 | | 10/2009 | Davies | |
| 2009/0284258 A1 | | 11/2009 | Morrison et al. | |
| 2010/0188089 A1 | | 7/2010 | Kuzmin et al. | |
| 2010/0237870 A1 | | 9/2010 | Dodds | |
| 2010/0244843 A1 | | 9/2010 | Kuzmin et al. | |

OTHER PUBLICATIONS

International Search Report issued on Mar. 10, 2011 in the corresponding International Patent Application No. PCT/CA2010/001863.

* cited by examiner

*Primary Examiner* — Paresh Patel
(74) *Attorney, Agent, or Firm* — Novak Druce Connolly Bove + Quigg LLP (57) ABSTRACT

An airborne geophysical surveying system comprising a receiver coil assembly for towing by an aircraft, the receiver assembly including a receiver coil for sensing changes in a magnetic field component of a magnetic field, and a receiver coil orientation sensing system for sensing orientation changes of the receiver coil. A controller receives signals representing the sensed changes in the magnetic field component from the receiver coil and the sensed orientation changes from the receiver coil orientation sensing system and corrects the sensed changes in the magnetic field component to provide a signal that is corrected for noise caused by changing orientation of the receiver coil in a static geomagnetic field.

17 Claims, 7 Drawing Sheets

RECEIVER COIL ASSEMBLY FOR AIRBORNE GEOPHYSICAL SURVEYING WITH NOISE MITIGATION

This application claims priority to and the benefit of U.S. Provisional Patent Application Ser. No. 61/264,762, filed Nov. 27, 2009.

BACKGROUND

Embodiments of the described invention relate to the field of airborne geological mapping and receiver systems used for such mapping.

Active source electromagnetic surveying such as time domain electromagnetic (TDEM) surveying is a rapidly developing area of geophysical surveying. It encompasses ground based and airborne applications. TDEM geological mapping involves measuring the magnetic response of the earth to a primary magnetic field transmitted by the survey system. The relation between the transmitted field and the response is used to calculate the electrical resistivity structure of the earth, from which geological information is inferred.

An example of a TDEM surveying system and method is shown in U.S. Pat. No. 7,157,914.

Natural source electromagnetic surveying has traditionally been performed using ground based techniques such as the magnetotelluric (MT) technique. Recently, airborne surveying using natural source electromagnetic techniques has become practical. In these techniques, two or more components of naturally occurring random fluctuations of the electromagnetic field of the earth are measured (possibly at different locations), and the frequency dependent transfer functions between the measured components are calculated. As in active source methods, the transfer functions are interpreted in terms of the electrical resistivity structure of the earth, from which geological information is inferred.

An example of a natural source electromagnetic surveying system is shown in U.S. Pat. No. 6,876,202

An active source electromagnetic survey system has a transmitter and a receiver, while a natural source system has only a receiver. Typically a transmitter includes a coil of one or more turns of electrical wire. When an electric current is passed through the wire, a magnetic field is transmitted. In TDEM surveying, a pulsed current of alternating polarity is used, and the response of the earth is sensed in the "off" time between transmitter current pulses.

A receiver or sensor typically includes of one or more multiturn coils of electrical wire. In the presence of a changing magnetic field, an electrical voltage appears across the terminals of each coil. This voltage can be amplified and recorded. Coils may have different orientations, making them sensitive to variations in magnetic field components having different directions. Other things being equal, the sensitivity and noise floor of a receiver coil improve as the coil is scaled up in size. The signals used in natural source systems are typically weaker, requiring larger receiver coils, compared to active source systems.

The response to movement and vibration of receivers used in active and natural source surveying systems is a significant noise source, especially in a turbulent airborne environment, becoming increasingly important as the signal frequency decreases below 100 Hz. A major contribution to this type of noise is caused by the motion of the receiver coil(s) relative to the static geomagnetic field. Motion or vibration that changes the total geomagnetic flux passing through a receiver coil causes a electrical voltage to appear across the terminals of the coil. In the case of a rigid receiver coil, this can be caused by rotation of the coil. No receiver coil is perfectly rigid, so flexing of the coil also contributes to such voltages. These voltages are a type of noise that interferes with the desired signal. Techniques for reduction of noise are important.

In some electromagnetic survey systems, the receiver is sensitive to changes in one component of the magnetic field, typically a nominally vertical component. Receivers that independently measure changes in two or three substantially orthogonal components of the magnetic field provide improved geological information, but are bulkier than single axis receivers.

Improved receiver systems for airborne geophysical survey systems are desirable.

SUMMARY

According to one example embodiment is an airborne geophysical surveying system that includes: a receiver coil assembly for towing by an aircraft, the receiver assembly including at least one receiver coil for sensing changes in a magnetic field component of a magnetic field, and a receiver coil orientation sensing system for sensing orientation changes of the receiver coil; and a controller receiving signals representing the sensed changes in the magnetic field component from the receiver coil and the sensed orientation changes from the receiver coil orientation sensing system and correcting the sensed changes in the magnetic field component to provide a signal that is corrected for noise caused by changing orientation of the receiver coil in a static geomagnetic field.

According to another example embodiment is a method of performing an airborne geophysical survey that includes: towing a receiver coil assembly with an aircraft, the receiver assembly including three receiver coils each having a respective coil axis that is substantially maintained at a known angle relative to the axes of the other receiver coils; sensing, with each of the receiver coils, a different magnetic field component of a magnetic field; sensing orientation changes of the receiver coil assembly in a static geomagnetic field; and correcting the sensed magnetic field component changes to provide magnetic field components that are corrected for noise caused by changing orientation of the receiver coils in the static geomagnetic field.

According to another example embodiment is a receiver coil assembly for towing by an aircraft for performing geophysical surveys, comprising a semi-rigid outer shell having a nominally vertical extent which is substantially less than an horizontal extent thereof, the outer shell housing a multiturn air core receiver coil and at least one solenoid receiver coils, each receiver coil sensing changes in a different magnetic field component and having an axis at a known angle to the axis of the other receiver coil, wherein the multiturn air core receiver coil has a nominally vertical axis and the solenoid receiver coil comprises a multiturn solenoid winding with a ferromagnetic core and has a horizontal axis.

According to another example embodiment is a receiver coil assembly for towing by an aircraft for performing geophysical surveys, including an outer shell including a tubular outer portion defining a polygonal or circular loop and a cross-shaped portion having a first tubular cross member extending across a first diameter of the tubular outer portion and a second tubular cross member extending across a second diameter of the tubular outer portion, the first diameter and second diameter being perpendicular to each other; a multiturn air core receiver coil extending around the tubular outer portion; a first solenoid receiver coil comprising multiturn solenoid windings about a ferromagnetic core and located in the first tubular cross member; and a second solenoid receiver coil comprising multiturn solenoid windings about a ferromagnetic core and located in the second tubular cross member, the receiver coils each sensing changes in a different magnetic field component of a magnetic field.

DETAILED DESCRIPTION

In one example embodiment, the receiver coil system includes a substantially rigid assembly carrying three coils of electrical wire having mutually orthogonal axes. These coils sense changes in three independent components of the magnetic field, which provides more information than a single axis receiver. In addition, the assembly carries an orientation sensing system, including angular accelerometers, a three axis fluxgate magnetometer and two axis tilt sensors. The rigid assembly is elastically suspended within a non-metallic enclosing outer shell which protects it from air flow and is in turn suspended directly or indirectly from a towing aircraft. The elastic suspension attenuates motion and vibration transmitted to the rigid assembly from the outer shell.

In this first example embodiment, a processing system accepts the outputs of the orientation sensing system. It uses them to calculate, and subtract from each of the receiver coil outputs, the noise which is caused by rotational motion of the receiver coils in the static geomagnetic field. It also uses them to combine the three receiver coil outputs to correct errors in each receiver output which result from static departures of the receiver coil assembly from its nominal orientation.

Alternatively, in the first example embodiment, the output of the fluxgate magnetometer may be used to combine the three receiver coil outputs to resolve a signal which would be sensed by a receiver coil oriented parallel to the geomagnetic field vector. In this resolved signal, noise due to rotation in the geomagnetic field is minimized, and changes caused by departures of the receiver coil assembly from its nominal orientation are eliminated.

In a second example embodiment, the receiver includes a semi-rigid assembly in the shape of a polygonal or circular loop having two perpendicular diameters, in a nominally horizontal plane. The outer polygonal or circular part of the assembly includes a multiturn coil of electrical wire, while multiturn solenoid windings with rod shaped ferromagnetic cores are positioned on the diameters and cross in the middle of the assembly. The assembly is partially enclosed by and elastically suspended at multiple points from a similarly shaped inner shell. The inner shell also carries six or more accelerometers positioned around its edge and oriented to sense rotations about three independent axes. The inner shell is fully enclosed by, and elastically suspended at multiple points from, a similarly shaped outer shell which protects the inner shell and semi-rigid assembly from air flow and is in turn suspended directly or indirectly from the towing aircraft. The elastic suspensions attenuate motion and vibration transmitted to the semi-rigid assembly from the outer shell.

In the second example embodiment, the multi-point suspensions distribute inertial loads uniformly, reducing the flexing of the semi-rigid assembly and inner shell. This improves their effective rigidity, or allows the equivalent rigidity to be achieved with less material. The use of ferromagnetic cores for the two coils having nominally horizontal axes reduces the size of the receiver in the nominally vertical direction.

In the second example embodiment, a processing system accepts the outputs of the accelerometers. It uses them in an adaptive noise cancellation algorithm to remove noise from each of the receiver coil outputs which is caused by motion of the receiver coils in the geomagnetic field. It also processes the dc component of the outputs of some of the accelerometers (those oriented with horizontal sensitive directions) to sense the tilt of the receiver coil system, and combines the three receiver coil outputs to correct errors in each receiver output which result from the static tilt of the receiver coil assembly relative to its nominal orientation. Optionally, heading information from a navigation system or other sensors may be used to additionally correct for departures from nominal heading.

A multi-turn coil serves as a receiver for changes in the magnetic field, measuring the magnetic field time derivative dB/dt. In the case of an active source TDEM system, the receiver coil is used to measure the time decay of eddy currents in geological structures during the OFF time following a transmitter pulse. In the case of a natural source system, the receiver senses random fluctuations of the natural electromagnetic field, which are affected by geological structures. Coil voltages are digitized by a known analog to digital converter (ADC) and processed and stored by a computer. Processing and storage may take place during the acquisition of the data, or at a later time.

Among other things, horizontal or vertical rotational motion of the receiver coil can introduce noise into the measurements made by the receiver system. For example, rotation of a vertical axis receiver coil about a horizontal axis can induce noise due to the movement of the receiver coil relative to the geomagnetic field. The effect of the noise tends to increase as the frequency decreases below 100 Hz, so introduction of this noise can provide a lower limit on the usable frequency range of the system. This in turn can place limits on the penetration depth provided by the survey system.

Departures of the receiver coil from its nominal attitude can introduce errors into the measurements. For example, tilting the axis of a horizontal axis receiver coil will cause it to respond to changes in the vertical magnetic field, in addition to the intended horizontal field, which may lead to errors in interpretation of the results.

Example embodiments are described herein for a multiple axis receiver coil system, and for de-noising such a receiver coil system to mitigate against noise and errors introduced through dynamic and static horizontal or vertical rotation of the receiver coil system.

Figure 1:
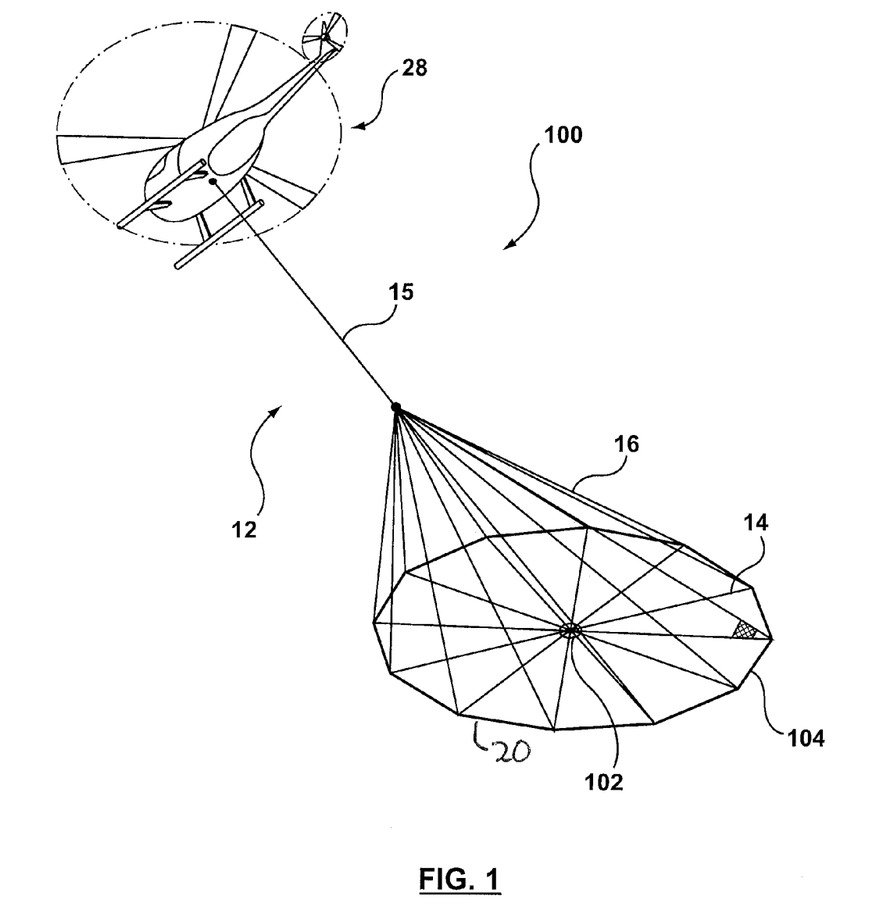
FIG. 1 is a perspective diagrammatic view of an airborne electromagnetic survey system according to an example embodiment of the invention.

For the purposes of explaining one example embodiment, FIG. 1 shows a schematic view of an airborne TDEM survey system 100 that includes a transmitter coil 104 and a receiver coil assembly or system 102. The TDEM survey system 100 can be carried by an aircraft 28 such as an airplane, helicopter, balloon or airship, for example. In at least some example embodiments, the transmitter coil 104 and receiver coil system 102 are part of a tow assembly 12 that is towed by the aircraft 28. In the example embodiment shown in FIG. 1, the transmitter coil 104 and receiver coil system 102 are substantially concentric, with the transmitter coil 104 being mounted to a frame 20 that is suspended from multiple support cables or ropes 16 that are each attached to a unique point on the circumference of the transmitter coil frame at one end and to a common tow cable 15 at the other end. In one example embodiment the transmitter coil frame 20 is a simple polygonal frame that approximates a circle and is formed from a plurality of tubular segments that define a continuous internal passage in which the transmitter coil 104 extends. In some example embodiments, the ropes 16 include at least one suspension cable or rope that supports the receiver coil system 102. The receiver coil system may in some example embodiments be centrally positioned by a series of radially extending cables or ropes 14 that extend to the transmitter coil frame 20. In one example embodiment, when in use the transmitter coil 104 is horizontally positioned with a substantially vertical dipole axis, and the receiver coil system 102 is located at a center of the transmitter coil 104.

The tow assembly configuration shown in FIG. 1 is merely one example of a many possible physical configurations that the TDEM survey system 100 can have—for example, in some embodiments the receiver coils system 102 can be physically supported separately from the transmitter coil 104 rather than being part of the same tow assembly.

Figure 2:
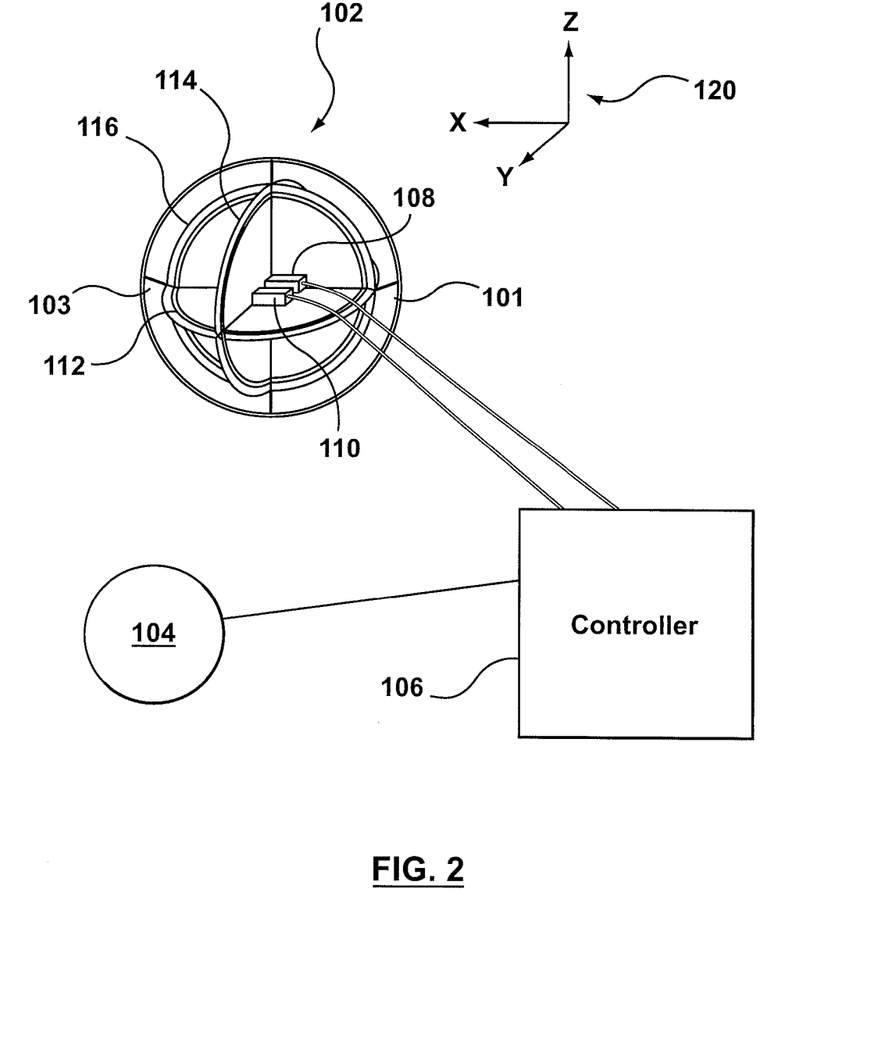
FIG. 2 is an illustrative view of a receiver system that can be used in the airborne electromagnetic survey system of FIG. 1.

FIG. 2 illustrates the receiver coil system 102 in greater detail. Also shown in FIG. 2 is a controller 106 that is included in the TDEM survey system 100, and which is coupled to both the transmitter coil 104 and the receiver coil system 102. The controller 106 includes, among other things, one or more analog to digital converters for converting data received from the receiver coil system 102, a transmitter driver for driving the transmitter coil 104, and a computer for controlling the overall operation of the TDEM survey system 100 and processing the data received through the components of the TDEM survey system 100. The controller 106 can also include an altimeter system for tracking the absolute and relative altitude of the TDEM survey system 100. In one example embodiment, the controller 106 is located within a body of the aircraft. In some example embodiments some of the functions of the controller 106 are performed at a location remote from the aircraft that is carrying the transmitter coil 104 and a receiver coil system 102.

In one example embodiment, the receiver coil system 102 includes a fully enclosing outer shell 101. Within the shell, an elastic suspension 103 supports a rigid receiver coil assembly. The rigid assembly includes three substantially planar coils that are substantially orthogonal to each other. For example, in its nominal orientation, a first or Z-axis coil 112 has a dipole axis that runs along a Z-axis, a second or X-axis coil 114 has a dipole axis oriented in a X-axis direction, and a third or Y-axis coil 116 has a dipole axis that is oriented along a Y-axis direction. As indicated by the X-Y-Z reference coordinates 120 shown in FIG. 2, the Z-axis corresponds to vertical, the X-axis extends horizontally in the direction of travel and the Y-Axis extends horizontally transverse to the direction of travel. During operation, the Z, X and Y axis coils 112, 114, 116 of the receiver coil system 102 move relative to the reference coordinate system 120, and example embodiments are directed to removing noise introduced by such movement.

In one non-limiting example embodiment, the Z, X and Y receiver coils 112, 114 and 116 each are air-core coils having 100 turns of approximately 1 square meter each turn, however many other numbers of coil turns and coil size could alternatively be used.

Output voltages from the Z-coil 112, the X-coil 114 and the Y-coil 116 are provided through a connection box 108 to the controller 106. The rigid receiver coil assembly also includes a coil orientation sensing system 110 that collects angular attitude and heading information about the rigid assembly for controller 106.

Figure 3:
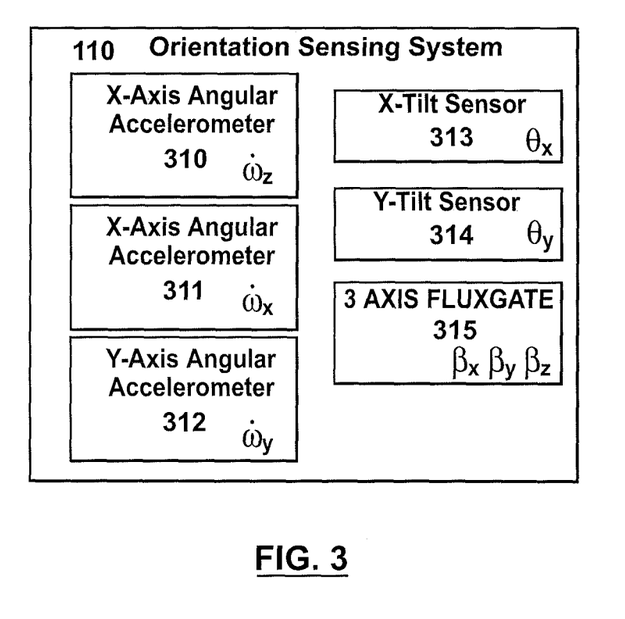
FIG. 3 is a block diagram representation of a receiver coil orientation sensing system of FIG. 2.

As shown in FIG. 3, in an example embodiment, the receiver coil orientation sensing system 110 senses the orientation and rotation rates of the rigid receiver coil assembly. Sensing system 110 includes three angular accelerometers 310, 311, 312, with sensitive rotational axes parallel to the axes of receiver coils 112, 114 and 116. The bandwidth of the angular accelerometers is 100 Hz or more, so that it includes at least the lower end of the range of frequencies which is sensed by the receiver coils 112, 114, and 116. Sensing system 110 includes a three-axis fluxgate magnetometer 315 with sensitive axes of receiver coils 112, 114 and 116, which measures the magnitude and direction of the geomagnetic field relative to the receiver coil axes. Sensing system 110 includes tilt sensors 313 and 314, which measure the tilt of the rigid receiver coil assembly relative to the z (vertical) axis as shown in reference coordinates 120 (FIG. 2). The bandwidth of the fluxgate and the tilt sensors may be substantially less than the bandwidth of the receiver coils and the accelerometers. The orientation sensing system can also include other orientation sensing equipment such as multiple GPS receivers operating in differential carrier phase mode, linear accelerometers, or gyroscope based sensors to measure the angular motion rates of the receiver system. Example embodiments can include all types of the sensors identified here, or a subset.

Figure 4:
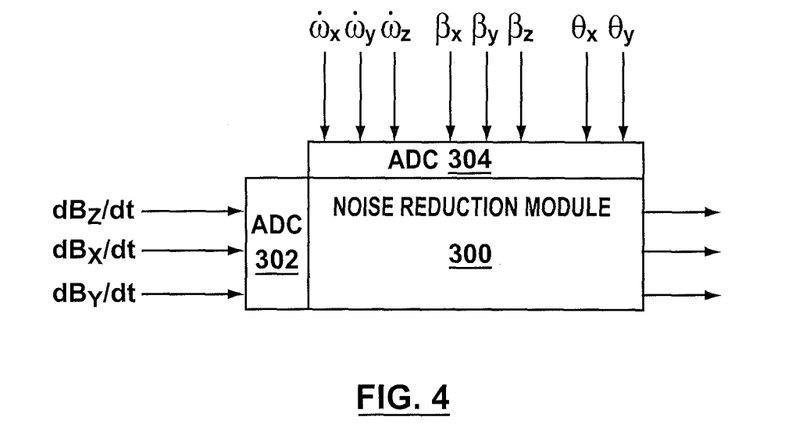
FIG. 4 is a block diagram representation of a noise reduction module used with the receiver coil assembly of FIG. 2.

With reference to FIG. 4, the controller 106 includes a noise reduction module 300 (which could for example be implemented by a suitably configured computer) for de-noising and correcting the receiver coil outputs received through analog to digital converters 302 from Z, X and Y receiver coils 112, 114, 116 in dependence on the information received through analog to digital converters 304 from the Z, X and Y angular accelerometers 310, 311 and 312, the tilt sensors 313 and 314, and the three axis fluxgate magnetometer 315.

Within the noise reduction module 300, the angular accelerometer outputs are processed using known techniques to determine instantaneous angular rotation rates of the receiver coil assembly about each of its axes. These rotation rates are combined with the geomagnetic field measured by the fluxgate 315 to predict the resulting voltages across each receiver coil outputs, which are then subtracted from each of the digitized receiver outputs to mitigate the effect of angular motion of the receiver coils system 102 in the geomagnetic field. In an additional processing step, the tilt sensor 313, 314 and fluxgate magnetometer 315 outputs are processed to determine a matrix which rotates vectors in the moving frame of reference defined by the sensitive axes of receiver coils 112, 114, and 116 into the fixed frame of reference 120. This matrix is then used to combine the outputs of receiver coils 112, 114 and 116 to correct the output signal of each coil for departures from its nominal orientation.

In some example embodiments, the voltages received from the receiver coils 112, 114 and 116 are digitized at a 50 to 200 kHz sampling rate, and coil orientation sensor system 110 outputs are sampled at 100 to 300 Hz. In some example embodiments, the noise reduction module 300 processes the digitized angular accelerometer outputs using known low pass filtering and numerical integration techniques to estimate the angular rotation rate pseudo-vector at each sample interval. For more accurate integration of the rotation rates, known techniques based on the representation of rotations by quaternions may be used. Once the angular rate estimate at each sample interval has been found, the predicted voltage across each receiver coil output is given by $$v_S = (S \times \Omega) \cdot B$$

where $v_S$ is the voltage across the coil with sensitive direction S; S is a vector representing the response of the coil, with magnitude equal to the effective area of the coil and direction the same as the sensitive direction (axis) of the coil; × denotes the vector cross product (outer product); $\Omega$ is the angular rotation rate pseudo-vector, derived as described above from the angular accelerometer outputs; · denotes the dot product (inner product) and B is the geomagnetic field vector as measured by the fluxgate magnetometer. The vectors and pseudo-vector are expressed in the coordinate system of the receiver coil assembly. Accordingly, the denoising module 300 processes the digitized orientation sensor outputs for each sample interval according to the above formula, yielding a motion noise estimate time series for each receiver coil. This time series is resampled using known techniques to obtain the sample rate of the digitized receiver coil outputs, scaled to account for the gains of the various analog to digital converters, and subtracted from the receiver coil time series outputs. A skilled practitioner could achieve similar results using variations of this process.

In some example embodiments, the tilt sensor outputs are used to define the tilt of the receiver coil assembly relative to the z (vertical) axis of 120. Given the tilt angles, the output of the fluxgate magnetometer 315 can be used to resolve the horizontal component of the geomagnetic field, giving the magnetic heading, thereby completely defining the orientation of the receiver coil assembly. To mitigate errors caused by the effect of acceleration on the tilt sensors, in some example embodiments, the long term attitude and heading determined from the fluxgate magnetometer 315 and tilt sensors 313 and 314 are be combined using known integration techniques with short-term orientation changes determined from the outputs of the angular accelerometers 310, 311, 312. The attitude and heading are processed using known techniques to determine a matrix which rotates vectors in the moving frame of reference defined by the sensitive axes of receiver coils 112, 114, and 116 into the fixed frame of reference 120. This matrix is then used to combine the outputs of receiver coils 112, 114 and 116 to correct the output signal of each coil for departures from its nominal orientation.

In some example embodiments, the angular compensation module 300 determines the angles between the geomagnetic field and the axes of the three receiver coils 112, 114, and 116 and combines the digitized voltages from the receiver coils to calculate the signal that would be measured by a receiver coil with its axis aligned with the geomagnetic field. The signal measured by a coil so aligned is insensitive to small changes in the coil orientation, which mitigates the effect of rotations of the receiver coil system. More specifically, the output from coil 112 is multiplied by the cosine of the angle between the coil axis and the geomagnetic field, similarly for coils 114 and 116, and the sum of these three contributions is output by module 300. The fluxgate magnetometer output yields the required cosines directly, by dividing each of the three components by the magnitude of the geomagnetic field vector. In an alternative embodiment using GPS receivers instead of a fluxgate magnetometer, the direction of the geomagnetic field is calculated from the geographic position of the survey location using standard formulas (e.g. those known as the "International Geomagnetic Reference Field") for the orientation of the geomagnetic field. This is then combined with the attitude and heading measurements of the receiver coil system determined from the GPS receivers to calculate the required angles.

Although the three receiver coils 112, 114 and 116 in the presently described embodiment have been described as being orthogonal to each other and generally oriented along Z, X and Y axis, the three receiver coils could be positioned at non-orthogonal angles relative to each other, so long as the relative angles are known, and the processing of the information received from the coils and orientation sensors adjusted accordingly.

In some example embodiments, the de-noising and orientation correction described above can also be applied to natural source airborne survey systems, including for example audio frequency magnetic (AFMAG) airborne systems that measure the earth's response to naturally occurring events such as lightening strikes.

The receiver coil system shown in FIG. 1 can fully implement a three axis, noise reduction and orientation correction capability as described above. There are a number of ways in which it can be modified so as to more conveniently and economically exploit those principles for specific applications. These modifications can be used to increase the effective rigidity, and reduce the size, the number and cost of sensors, and the strength of the motions which are to be compensated. These modifications are illustrated in an example embodiment described below.

Figure 5A:
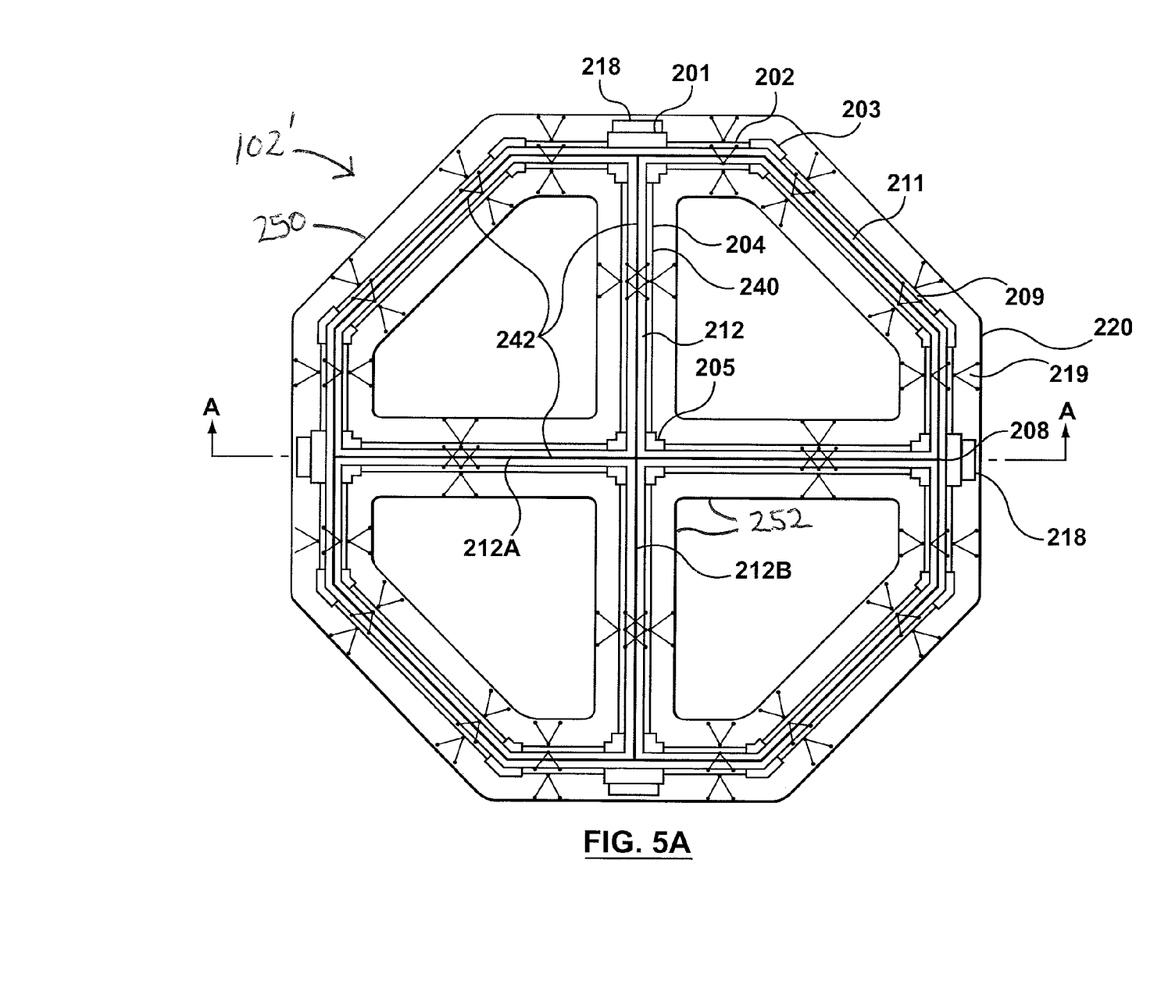
FIG. 5A is a view of alternative receiver coil system that can be used in the airborne electromagnetic survey system of FIG. 1. This is a plan view, with the upper half of the outer shell removed to shown the inner shell and coil assembly.
Figure 5B:
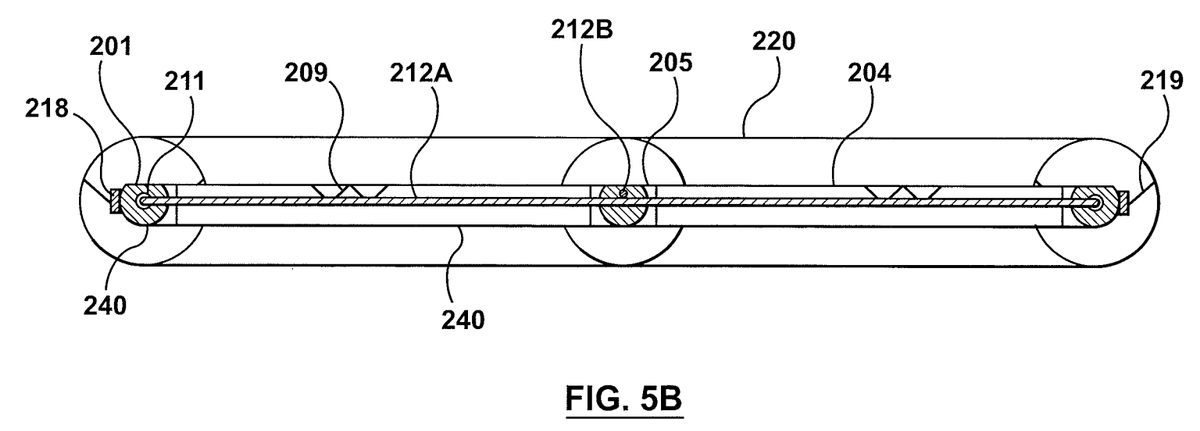
FIG. 5B is a cutaway side view of the alternative receiver coil system shown in FIG. 5A, taken along the lines A-A of FIG. 5A.

Referring to the example embodiment in FIGS. 5A and 5B, there is shown an alternative embodiment of a receiver coil assembly 102' that can be used in survey system 100 in place of receiver coil system 102 discussed above. The receiver coil assembly 102' includes an outer tubular frame or shell 220 housing an inner frame or shell 240 in which an inner coil assembly 242 is positioned. In the plan view of FIG. 5A, an upper half of the tubular outer shell 220 is removed to show the inner shell 240 and inner coil assembly 242. In some example embodiments, an upper half of the tubular outer shell 220 is releasably secured to a lower half to allow the halves to be separated for servicing of the inner shell 240 and inner coil assembly 242. In the illustrated embodiment, the tubular outer shell 220 includes an outer polygonal portion 250 with a central X or t-shaped portion 252. Polygonal portion 250 is octagonal in FIG. 5A, and approximates a circle, however it could take other forms—for example it could be circular or square or have more or fewer sides than eight. The semi-rigid outer shell 220 has a nominally vertical extent which is substantially less than a horizontal extent thereof, giving the shell a small vertical profile.

The inner coil assembly 242 includes multiturn air core loop 211 with a nominally vertical axis ("Z coil"), and two solenoid coils 212A and 212B (referred to generically using reference 212 herein) with ferromagnetic cores ("cored coils") with mutually orthogonal, nominally horizontal axes. The air core loop 211 is housed primarily within the polygonal portion 250 of outer shell 220, and the cored coils 212A, 212B are housed primarily with the central X or t shaped portion 252. Accordingly, in an example embodiment, the outer shell 220 is a semi-rigid shell having a tubular outer portion 250 defining a polygonal or circular loop and a cross-shaped portion 252 having a first tubular cross member extending across a first diameter having a first tubular cross member extending across a first diameter of the tubular outer portion 250 and a second tubular cross member extending across a second diameter of the tubular outer portion 250 that is perpendicular to the first diameter. The outer portion 250 and the cross-shaped portion 252 are in a nominally horizontal plane. The outer polygonal or circular portion 250 of each shell includes a multi-turn air core coil 211 of electrical wire, while coils 212A and 212B made up of multiturn solenoid windings with rod shaped ferromagnetic cores are each positioned in a respective cross member. The inner shell 240 has a shape that corresponds to that of the outer shell 220. The inner coil assembly 242 of FIGS. 5A and 5B is intended to be rigid so its rotational motion has only three degrees of freedom. Because it is constructed of components which are narrow (in contrast to the structure of FIG. 1), the inner coil assembly 242 will flex in response to movement and vibration. To minimize this flexing, the inner coil assembly 242 is suspended from the inner shell 240 by highly compliant sets of elastomeric cords 209. The cords 209 are positioned so as to support the inner coil assembly 242 (and in particular each of the air core coil or loop 211, and solenoid coils 212A and 212B) at multiple points so that inertial forces are applied uniformly to the inner coil assembly 242, thereby reducing the resulting bending moments on components of the assembly 242. This increases the effective rigidity of the receiver coil assembly 242. The compliance of the cords 209 is chosen, considering the mass of the receiver coil assembly 242 components, so that motion and vibration transmitted by the cords 209 to the assembly 242 from the inner shell 240 is attenuated in the frequency range of the magnetic signals being sensed.

Figure 6:
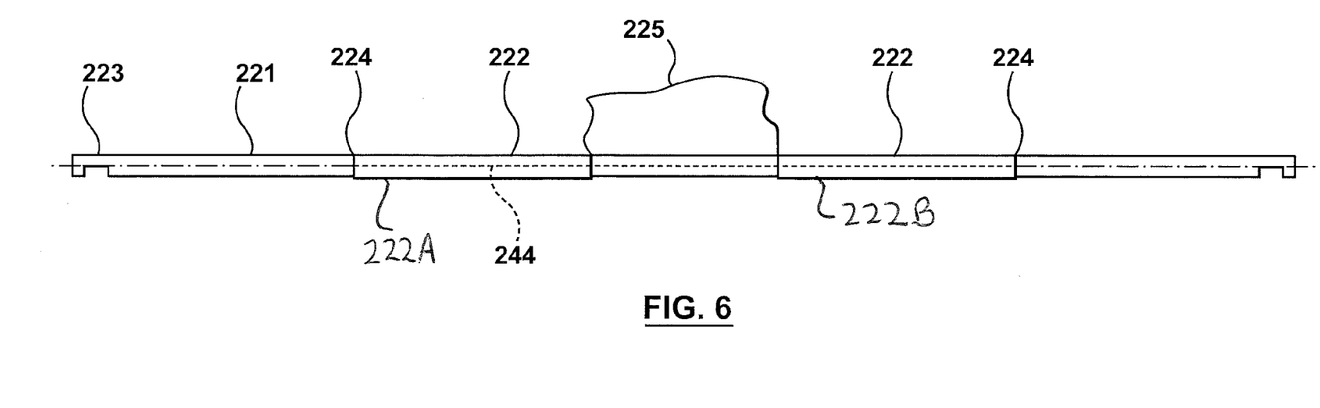
FIG. 6 is a diagram of a solenoid coil assembly with a ferromagnetic core, which is a component of the receiver coil system shown in FIG. 5.

An example of one of the cored coils 212A, 212B is shown in more detail in FIG. 6, and consist of a rigid plastic tube 221, a winding 222 that extends along the plastic tube 221 in two separate parts 222A and 222B connected in series by a wire 225, and a rod shaped ferromagnetic core 244. The core 244 is shown schematically in FIG. 6, as a dotted line. It may for example have an approximately circular or square cross-section which is able to fit within the plastic tube 221, having a width comparable to the inner diameter of the plastic tube 221. The core 244 is fixed inside the plastic tube 221 and is at least long enough to occupy the tube 221 inside both sections 222A and 222B of the winding 222. The plastic tube 221 has two notches 223 at its ends, which hook over the Z coil loop 211. One cored coil 212A hooks over and is attached to the Z coil loop 211 from below and the other cored coil 212B hooks over and is attached to the Z-coil loop 211 from above, so that the cored coils 212A, 212B make contact and cross over each other at the center of the receiver coil assembly 102'. The spaced apart coil sections 222A, 222B on each cored coil 212A, 212B is located on opposite sides of the center of the receiver coil assembly 102'. In an example embodiment, the ferromagnetic core 244 is constructed of a material that has minimal magnetostriction so as to reduce noise generated by flexing of the core. In the case of a TDEM system, the core 244 is processed to minimize its tendency to acquire remnant magnetization in response to the transmitted field. In other example embodiments, the mechanical details of the cored coils 212A, 212B and their installation may differ from the example embodiment.

Referring again to FIG. 5A, the inner shell 240 is constructed of standard non-metallic pipe sections 202 and 204, elbows 203, tees 201, and a cross 205. In some example embodiments, after assembly, part of the upper surface of the inner shell 240 is cut away to allow the suspension cords 209 and the inner coil assembly 242 to be installed. This produces a light and relatively rigid structure. Other construction techniques and materials are possible. For example, the function of the inner shell 240 could be implemented by one or more skeletal structures or rods which would contribute to the isolation of the inner coil assembly 242 from the motion of the outer shell 220.

In one non-limiting example embodiment, used in an active source TDEM system, the overall diameter of the outer shell 220 is 1.3 m and the diameter of the tubular components of the outer shell (the diameters and the segments of the tubular polygonal perimeter) is 0.16 m. The diameter of the tubular components of the inner shell is 60 mm. The diameter of the plastic tubes 221 is 16 mm. Other dimensions can be used in other embodiments—for example, the outer shell 220 could have a diameter greater or less than 1.3 m and its tubular components could have a diameter of more or less than 0.16 m.

While the inner shell 240 is more rigid than the inner coil assembly 242, it will flex to some extent, and that flexing will be transmitted to some extent to the inner coil assembly 242. To minimize the flexing, and attenuate motion and vibration, the inner shell 240 is suspended from the outer shell 220 by highly compliant sets of elastomeric cords 219. The cords 219 are chosen based on the same considerations as for the inner coil assembly suspension cords 209 described above.

In an example embodiment the motion of the inner shell 242 is sensed by receiver coil orientation sensing system, including for example two axis accelerometers 218, one of which is attached to the inner shell 242 near the end of one of the cored coils 212A, and the other of which is attached to the inner shell 242 near the end of the other of the cored coils 212B. Each accelerometer 218 has one sensitive axis which is axial (i.e. nominally vertical) and another which is tangential (i.e. parallel to the nearest segment of the Z-coil loop 211).

To the extent that the inner shell 242 is rigid, its rotational acceleration can be measured by taking the difference between appropriately selected pairs of outputs of accelerometers 218 located at opposite ends of a diameter. To the extent that the inner shell 242 and the inner coil assembly 242 are rigid, and the suspension cords 209 are linear and elastic, there is for any specified frequency and axis of rotation, a transfer function that relates the inner receiver coil assembly 242 rotation to the inner shell 242 rotation. In turn, there is a transfer function (which depends on the geomagnetic field) that relates noise generated in the receiver coils 211, 212A, 212B (by rotation in the geomagnetic field) to the inner receiver coil assembly 242 rotation. It follows that there are composite transfer functions that relate the accelerometer 218 outputs to the noise generated in each receiver coil 211, 212A, 212B by rotation. Known techniques of adaptive noise cancellation are used to discover these transfer functions, track their changes as system parameters change, and subtract the noise from the receiver coil outputs.

In this example embodiment of FIGS. 5A and 5B, analog to digital converter 304 differs from that previously discussed in respect of FIG. 4 in that it has an input for each accelerometer in the two axis accelerometers 218. Each input is digitized and resampled to produce a sample rate the equal to that of the analog to digital converter 302. Each accelerometer derived time series is processed using finite impulse response digital operators, one for each receiver coil channel, to yield noise cancellation time series. The noise cancellation time series are subtracted from their corresponding receiver coil derived time series. The coefficients of the finite impulse response operators are continuously adjusted to cancel the noise in the receiver coils time series using known adaptive noise cancellation techniques (e.g. see B. Widrow et al., "Adaptive Noise Cancelling: Principles and Applications", Proc. IEEE, vol. 63, pp. 1692-1716, December 1975.) This type of "time domain" processing is most appropriate for active source, TDEM applications.

In another example embodiment, all the digital time series derived from the accelerometer 218 outputs and the receiver coil 211, 212A, 212B voltages are divided into overlapping time windows and known techniques are used to calculate complex Fourier transforms of the time series segments in each time window. At each frequency of interest, the Fourier transforms for a group of consecutive time windows is processed to calculate a covariance matrix. The covariance matrix is used to remove from the Fourier transforms of each receiver coil output, the component that is correlated with the accelerometer outputs. A practitioner skilled in the art will recognize that this type of "frequency domain" noise cancellation is equivalent to the "time domain" processing described in the previous paragraph, and is appropriate for natural source applications.

The inner receiver coil assembly 242 and inner shell 240 are not rigid, so that flexing and vibration will also contribute to the noise in the receiver coil 211, 212A, 212B outputs. To the extent that the flexing and vibration are correlated with the accelerometer outputs, adaptive noise cancellation techniques will adjust the calculated transfer functions so that this noise component will be partially cancelled.

In the example embodiment of FIGS. 5A and 5B, the accelerometers 218 with horizontal axes can be used to measure the tilt of the inner shell 240. The coefficients of the adaptive noise cancellation process described above can optionally processed to determine the direction of the geomagnetic field. A set of coefficients correlating rotation rate to noise in the receiver coil outputs, can be solved to find a rotational axis which causes minimum noise. The direction of this axis is an estimate of the geomagnetic field direction, and its horizontal component is an estimate of heading. The tilt and heading information can be used as described earlier to correct the output signal of each coil for departures from its nominal orientation. Alternatively, another sources of heading information such as GPS or a fluxgate magnetometer could be used.

The example embodiment of FIGS. 5A and 5B provides a low profile 3-axis coil assembly and may be especially useful in the case of a multiple axis receiver system that is to be towed from a fixed wing aircraft. For takeoff and landing of a fixed wing survey aircraft, the towed vehicle ("bird") containing the receiver coil assembly must be stowed below the aircraft fuselage. Its vertical dimension is limited because it must clear the ground during takeoff and landing. The configuration of FIGS. 5A and 5B minimizes the vertical dimension of the receiver coil system. In such an embodiment, it may be preferable to use a different shape for the outer loop, such as a rectangular shape, instead of the octagonal shape shown, without changing the principle of the technique.

The example embodiment of FIGS. 5A and 5B applies the same principles as the embodiment of FIG. 2. The combination of a Z-axis loop 211 with cored coils 212A, 212B for the horizontal axes allows the receiver assembly to be smaller in the vertical direction and lighter. The use of a double suspension with multipoint support of the inner coil assembly 242 and inner shell 240 improves the effective rigidity of the assembly and offers enhanced (two stage) attenuation of motion at the receiver coil. The use of adaptive noise cancellation techniques allows for the use of only one type of motion sensor, and the electromagnetic noise produced by some motion sensors (especially fluxgate magnetometers) is eliminated. Mounting the attitude or motion sensors on the inner shell 240 instead of the inner coil assembly 242 increases the amplitude of accelerometer outputs, so that the noise specification of the accelerometers is less demanding.

In some applications, the example embodiment of FIGS. 5A and 5B with its reduced rigidity of the inner coil assembly 242 affects the accuracy of the noise removal. The sensors do not allow the direction of the geomagnetic field to be directly sensed. The cored coils 212 may generate noise as a result of the magnetostrictive property of the core, and in TDEM applications, remnant magnetization of the core in response to the field of the transmitter may affect the measurements. Some example embodiments may therefore have some features like the embodiment of FIG. 1, combined with other features from FIGS. 5A and 5B, as appropriate for a specific application. Furthermore, some embodiments may achieve some of the benefits of the embodiment of FIGS. 5A/5B with a reduced set of sensors. Accelerometers could be mounted directly to the receiver coils 211 and 212A, 212B instead of the inner shell 240. A reduced set of accelerometers could allow significant noise reduction using adaptive noise cancellation techniques. A single (Z-axis) receiver coil system could use motion sensors with adaptive noise cancellation to reduce noise.

Even without motion sensors of any kind, three axis data acquired in flight can be processed using the approximation that the receiver coil is horizontal and that its bearing is the same as the aircraft heading or track direction. For greater accuracy, the aircraft can cover the survey area by flying on a series of parallel lines, with each line being flown in the direction opposite to the flight direction of the immediately adjacent lines. The departure of the sensor from it nominal orientation will cause consistent differences between the results measured on one line and the immediately adjacent lines flown in the opposite direction. The differences can be analyzed to infer the receiver tilt and heading, relative to the flight direction, which minimizes these differences, and the data can be corrected for this inferred orientation.

Figure 7:
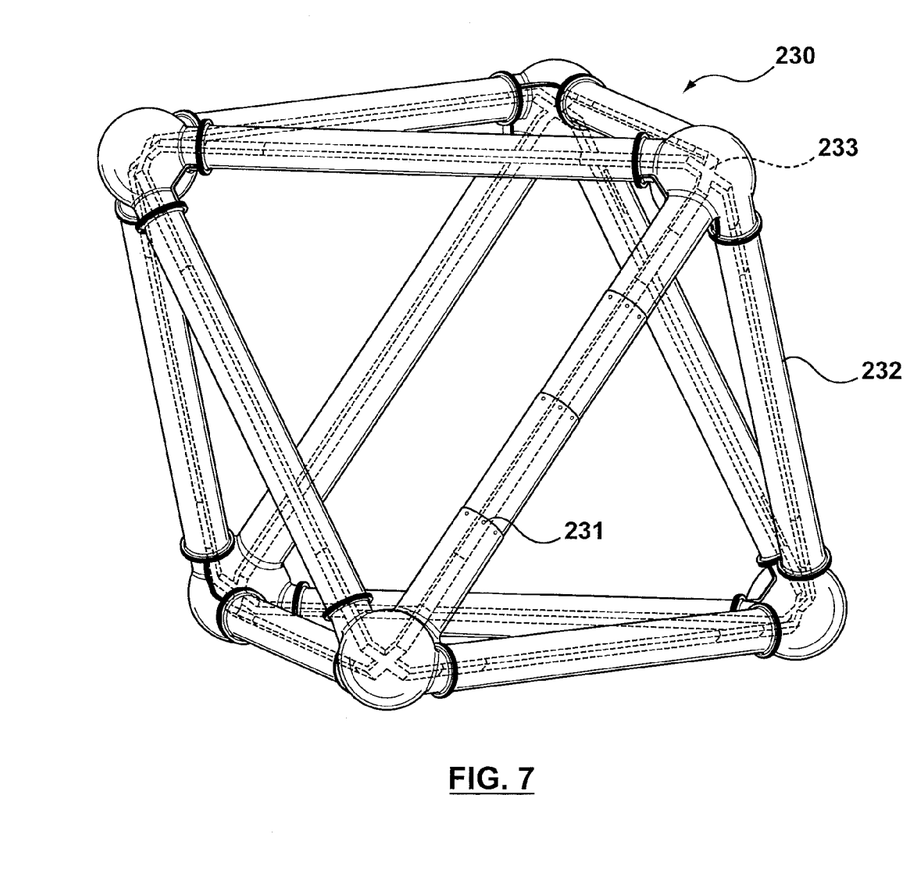
FIG. 7 is a diagram of an alternative receiver coil system using three square coils suspended in an external shell in the form of a regular octahedron.

In one example embodiment shown in FIG. 7, a three axis receiver coil system 230 for a natural source survey system includes three square coils with a width of approximately 3 m, in a semi-rigid skeletal assembly 231 having the form of a regular octahedron, suspended from and enclosed in a outer shell 232 of similar form. Many configurations of motion sensors are possible. In one example embodiment, a pair of accelerometers is located at each of the six vertices 233 on the receiver coil assembly, with their sensitive axes perpendicular to each other and to a line from the vertex to the center of the octahedron. Adaptive noise cancellation techniques are used, with the accelerometer outputs as noise samples, to remove noise from the receiver coil outputs. In addition, the orientation of each coil relative to the vertical is determined from the dc component of the accelerometer outputs.

In one example embodiment, a single receiver coil is used. It is 8 m across and similar in form to the embodiment of FIGS. 5A/5B, but without the two cored coils or the segments of the shells (located along diameters of the Z coil) that enclose them. Pairs of accelerometers are mounted at three or more vertices of the loop, with their sensitive axes aligned in vertical and radial directions, so that they will respond to rigid rotations and also to flexing motions of the receiver coil assembly. Adaptive noise cancellation techniques are used, with the accelerometer outputs as noise samples, to remove noise from the receiver coil outputs. In addition, the orientation of the coil relative to the vertical is determined from the dc component of the accelerometer outputs.

The specific sensors used in the example embodiments described could be replaced with other types of sensors. In some embodiments, the rotation motion sensed by a pair of accelerometers oriented in the same direction but located at opposite sides of a receiver coil assembly could be detected by a single angular rate sensor. In some embodiments, the geomagnetic field sensed by a fluxgate magnetometer could instead be calculated from known models of the Earth's field (such as the International Geomagnetic Reference Field model) using direction information derived from two GPS receivers located on the receiver system, or (more approximately) from track bearing information derived from a single GPS receiver located on the towing aircraft.

What is claimed is:

1. An airborne geophysical surveying system comprising:
   a receiver coil assembly for towing by an aircraft, the receiver assembly including at least one receiver coil for sensing changes in a magnetic field component of a magnetic field, and a receiver coil orientation sensing system for sensing orientation changes of the receiver coil; and
   a controller receiving signals representing the sensed changes in the magnetic field component from the receiver coil and the sensed orientation changes from the receiver coil orientation sensing system, and correcting the sensed changes in the magnetic field component to provide a signal that is corrected for noise caused by changing orientation of the receiver coil in a static geomagnetic field, wherein the controller provides the corrected signal by:
   predicting, in dependence on the signal from the receiver coil orientation system, a resulting signal from the receiver coil, and
   subtracting the resulting signal from the signal received from the receiver coil.

2. The system of claim 1 wherein the receiver coil orientation sensing system includes one or more accelerometers or angular rate sensors for sensing rotations of the receiver coil assembly about at least two independent axes.

3. The system of claim 2 wherein the orientation sensing system includes a three-axis fluxgate magnetometer having sensitive axes that correspond to the receiver coil axis for measuring a magnitude and direction of the static geomagnetic field relative to the receiver coil axis, the controller determining an instantaneous angular rotation rate of the receiver coil assembly about the receiver coil axis and combining the rotation rate with the geomagnetic field magnitude and direction measurement to predict the resulting signal from the receiver coil.

4. The system of claim 2 wherein the controller processes signals from the orientation sensing system to determine the orientation of the receiver coil in a geographic coordinate system, determine the static geomagnetic field from a known formula, determine the instantaneous angular rotation rate of the receiver coil assembly about the receiver coil axis and combine the rotation rate with the determined orientation and static geometric field to predict the resulting signal from the receiver coil.

5. The system of claim 2 wherein the controller corrects the magnetic field component for noise caused by changing orientation of the receiver coil in the static geomagnetic field by applying an adaptive noise cancellation algorithm to signals from the accelerometers or angular rate sensors to predict the resulting signal from the receiver coil.

6. The system of claim 1 wherein the receiver coil assembly includes three receiver coils each having a coil axis that is substantially maintained at a known angle relative to the axes of the other receiver coils, each of the receiver coils sensing changes in a different magnetic field component of the magnetic field, the receiver coil orientation sensing system sensing orientation changes of all of the receiver coils, the controller receiving signals representing the sensed magnetic field component changes from each of the receiver coils and the sensed orientation changes from the receiver coil orientation sensing system and correcting the sensed magnetic field component changes to provide magnetic field components that are corrected for noise caused by changing orientation of the receiver coils in the static geomagnetic field.

7. The system of claim 6 wherein the axes of the three receiver coils are mutually orthogonal and the three independent axes correspond to the three receiver coil axes.

8. The system of claim 6 wherein the orientation sensing system includes a three-axis fluxgate magnetometer having three sensitive axes that correspond to the three receiver coil axes for measuring a magnitude and direction of the static geomagnetic field relative to the receiver coil axes, the controller combining the signals received from the three receiver coils in dependence on geomagnetic field measurements from the fluxgate magnetometer to obtain a signal corresponding to changes in the magnetic field component which is parallel to the geomagnetic field.

9. The system of claim 6 wherein the three receiver coils are air core coils elastically suspended within a rigid spherical outer shell.

10. The system of claim 6 wherein the three receiver coils are elastically suspended within a semi-rigid skeletal frame having the form of a regular octahedron.

11. The system of claim 6 wherein the receiver coil assembly comprises a semi- rigid outer shell having a nominally vertical extent which is substantially less than a horizontal extent thereof, one of the receiver coils being a multiturn air core coil housed within a tubular loop defined by the outer shell and having a nominally vertical axis and the other receiver coils each comprising multiturn solenoid windings with ferromagnetic cores having a horizontal axis.

12. The system of claim 11 wherein the tubular loop of the semi-rigid outer shell takes the form of a polygonal or circular loop, the semi-rigid outer shell having two perpendicular diameters across the loop in a nominally horizontal plane, the multiturn air core coil being located in the loop and the other receiver coils each being positioned in a respective one of the perpendicular diameters of the outer shell.

13. The system of claim 12 wherein each of the receiver coils are elastically suspended from a semi-rigid inner member which in turn is elastically suspended within the semi-rigid outer shell.

14. The system of claim 13 wherein at least part of the orientation sensing system is attached to the semi-rigid inner member.

15. The system of claim 1 further including a transmitter coil for generating a time varying pulsed signal having successive on and off durations, the receiver coils sensing changes in the magnetic field components during the off-durations of the transmitter coil.

16. The system of claim 1 wherein the changes in magnetic field components sensed by the receiver coils are naturally occurring random fluctuations of the magnetic field.

17. A method of performing an airborne geophysical survey comprising:
   towing a receiver coil assembly with an aircraft, the receiver assembly including three receiver coils each having a respective coil axis that is substantially maintained at a known angle relative to the axes of the other receiver coils;

sensing, with each of the receiver coils, a different magnetic field component of a magnetic field;
sensing orientation changes of the receiver coil assembly in a static geomagnetic field; and
correcting the sensed magnetic field component changes to provide magnetic field components that are corrected for noise caused by changing orientation of the receiver coils in the static geomagnetic field, wherein correcting the sensed magnetic field component changes comprises:
predicting, in dependence on the sensed orientation changes, a resulting signal from the receiver coil, and
subtracting the resulting signal from the sensed magnetic field components.

* * * * *